United States Patent
Chen et al.

(10) Patent No.: US 11,196,784 B2
(45) Date of Patent: Dec. 7, 2021

(54) METHOD, APPARATUS AND SYSTEM FOR CREATING DISCUSSION GROUP BASED ON INSTANT MESSAGING

(71) Applicant: LUNKR TECHNOLOGY (GUANGZHOU) CO., LTD., Guangdong (CN)

(72) Inventors: Yingtang Chen, Guangdong (CN); Dajian Xuan, Guangdong (CN)

(73) Assignee: LUNKR TECHNOLOGY (GUANGZHOU) CO., LTD., Guangzhou (CN)

( * ) Notice: Subject to any disclaimer, the term of this patent is extended or adjusted under 35 U.S.C. 154(b) by 0 days.

(21) Appl. No.: 16/961,243

(22) PCT Filed: Jan. 3, 2019

(86) PCT No.: PCT/CN2019/070238
§ 371 (c)(1),
(2) Date: Jul. 9, 2020

(87) PCT Pub. No.: WO2019/137291
PCT Pub. Date: Jul. 18, 2019

(65) Prior Publication Data
US 2021/0067570 A1 Mar. 4, 2021

(30) Foreign Application Priority Data
Jan. 9, 2018 (CN) .......................... 201810025460.8

(51) Int. Cl.
*G06F 15/16* (2006.01)
*H04L 29/06* (2006.01)
(Continued)

(52) U.S. Cl.
CPC ........ *H04L 65/4053* (2013.01); *H04L 51/046* (2013.01); *H04L 51/22* (2013.01); *G06F 8/38* (2013.01); *G09B 5/08* (2013.01)

(58) Field of Classification Search
CPC ... H04L 65/4053; H04L 51/046; H04L 51/22; G06F 5/08; G09B 5/08
See application file for complete search history.

(56) References Cited

U.S. PATENT DOCUMENTS

2004/0137882 A1* 7/2004 Forsyth ............... H04L 12/1822
455/414.1
2008/0021913 A1* 1/2008 Tatavu ............... G06F 16/24553
(Continued)

FOREIGN PATENT DOCUMENTS

CN 104935502 A 9/2015
CN 107368238 A 11/2017

OTHER PUBLICATIONS

International Search Report of PCT Patent Application No. PCT/CN2019/070238 dated Apr. 2, 2019.

*Primary Examiner* — Oleg Survillo

(57) ABSTRACT

A method, apparatus and system for creating a discussion group based on instant messaging. Creating a new discussion group in response to a discussion group creating request sent by a client according to a page of an original discussion group, and taking members of the original discussion group as members of the new discussion group; receiving the members and a subject of the new discussion group that are added, deleted or changed on an editing page and sent by the client, and updating the same to the editing page of a local database; generating, in response to a confirmation request sent by the client, a discussion page and an instant messaging link associated with each other, and sending the instant messaging link to clients of all the members of the new (Continued)

discussion group; and entering, by the client, the new discussion group through the link.

11 Claims, 7 Drawing Sheets

(51) Int. Cl.
*H04L 12/58* (2006.01)
*G06F 8/38* (2018.01)
*G09B 5/08* (2006.01)

(56) References Cited

U.S. PATENT DOCUMENTS

| | | | |
|---|---|---|---|
| 2008/0052203 A1* | 2/2008 | Beyer | G06Q 10/087 |
| | | | 705/28 |
| 2009/0043843 A1* | 2/2009 | Milewski | H04L 51/04 |
| | | | 709/204 |
| 2014/0279628 A1* | 9/2014 | Straznitskas | G06Q 10/105 |
| | | | 705/320 |
| 2015/0271116 A1* | 9/2015 | Huang | H04L 63/08 |
| | | | 709/206 |
| 2017/0063764 A1* | 3/2017 | Lindley | H04L 51/22 |
| 2017/0140658 A1* | 5/2017 | Aluvala | H04W 12/61 |
| 2018/0062921 A1* | 3/2018 | Jones | H04L 41/22 |
| 2019/0129597 A1* | 5/2019 | Lewis | G09B 5/00 |
| 2019/0182227 A1* | 6/2019 | Rutherford-Jenkins | H04L 51/22 |
| 2019/0253431 A1* | 8/2019 | Atanda | G06F 21/62 |
| 2021/0067475 A1* | 3/2021 | Chen | H04L 12/1818 |

* cited by examiner

METHOD, APPARATUS AND SYSTEM FOR CREATING DISCUSSION GROUP BASED ON INSTANT MESSAGING

TECHNICAL FIELD

The present invention relates to the field of instant messaging, and in particular, to a method, an apparatus and a system for creating a discussion group based on instant messaging.

BACKGROUND

Enterprise instant messaging is classified into two types. One type focuses on working within an enterprise, to establish a communication platform for employees, reduce operating costs, and improve enterprise working efficiency. The other type is used for integrating related applications based on instant messaging. Up till now, enterprise communication software, such as XG Push, AnyChat IM, ActiveMessenger, QuickDove, Tencent RTX, Arrow IM, Dingdang Wangyetong, Microsoft Lync, SUNDNS Lync, BigAnt, Anychat, IBMLotus Sametime, imo-Instant Messaging Office, Tencent EC, China Mobile Enterprise Fetion, FastMsg, Yiao, and CECISEIM, has been widely used by various enterprises.

An email system is indispensable communication software in an enterprise informatization process. Generally, enterprises may use various solutions such as self-construction, renting, and cloud deployment. No matter which solution is used, the basic function of the solution is to provide an email communication service for enterprise employees and external customers by using the email system.

However, in the prior art, a user needs to manually add members to a newly created discussion group, and the member adding function is neither associated with an enterprise address book nor can be directly connected to the email system based on the created discussion group.

SUMMARY

A technical problem to be solved by embodiments of the present invention is to provide a method, an apparatus and a system for creating a discussion group based on instant messaging, so that a new discussion group can be created in an original discussion group, and the newly created discussion group is connected to an email system, thereby implementing automatic recognition and addition of members and subjects, which is fast and efficient and reduces the communication cost.

To resolve the above problem, embodiments of the present invention provide a method for creating a discussion group based on instant messaging, including the following steps:

creating a new discussion group in response to a discussion group creating request sent by a client according to a page of an original discussion group, and taking members of the original discussion group as members of the new discussion group by default;

generating an editing page according to the new discussion group, and sending the editing page to the client;

unlocking an editing tool of the editing page in response to an editing request sent by the client according to the editing page;

receiving the members and a subject of the new discussion group that are added, deleted or changed by using the editing tool and sent by the client, and updating the members and the subject of the new discussion group to the editing page of a local database in real time;

generating, in response to a confirmation request sent by the client according to the editing page, a discussion page and an instant messaging link associated with each other, and sending the instant messaging link to clients of all the members of the new discussion group; and sending the discussion page of the new discussion group to the client in response to an access request sent by the client according to the instant messaging link.

Preferably, the page of the original discussion group, the editing page and the discussion page each include one or a combination of more than one of a link, a text, a picture, or an attachment.

Preferably, the members of the original discussion group and the members of the new discussion group are all associated with an address book of the client; and the address book includes names, email addresses, contact numbers, and departments and positions.

Preferably, the method for creating a discussion group based on instant messaging further includes:

receiving marked content sent by the client according to the discussion page of the discussion group, classifying the marked content by time, type or subject, and saving the marked content in the local database;

generating a sharing page according to the marked content in response to an email sharing request sent by the client according to the discussion page, and sending the sharing page to the client;

taking a discussion subject of the discussion group corresponding to the email sharing request as an email subject by default and taking the members of the discussion group corresponding to the email sharing request as email recipients by default according to the email sharing request;

receiving shared content that is formed by one or more pieces of the marked content and sent by the client according to the sharing page, and generating an email body in a preset format according to the shared content by using a syntax tree;

generating an email page according to the email body, the email subject and the email recipients, and sending the email page to the client; and packaging the email page into an email and sending the email to email addresses corresponding to the email recipients in response to a sending request sent by the client according to the email page.

Preferably, the method for creating a discussion group based on instant messaging further includes:

synchronously updating marked content in the local database in real time in response to an operation instruction edited by the client according to the marked content, where the marked content is record content selected and marked by the client according to a discussion information flow of the discussion page; the record content is saved in the local database; the record content includes a link, a text, a picture, and an attachment; and the discussion information flow and the marked content both include timestamps.

Preferably, the generating an email body in a preset format according to the shared content by using a syntax tree specifically includes:

extracting a message body from the shared content; and recognizing a subject, a predicate, and an object of the message body by using the syntax tree, and integrating the subject, the predicate and the object into the email body according to the preset format.

Embodiments of the present invention further provide an apparatus for creating a discussion group based on instant messaging, including:

a group creating request processing unit, configured to create a new discussion group in response to a discussion group creating request sent by a client according to a page of an original discussion group, take members of the original discussion group as members of the new discussion group by default, generate an editing page according to the new discussion group, and send the editing page to the client;

an editing unit, configured to unlock an editing tool of the editing page in response to an editing request sent by the client according to the editing page; receive the members and a subject of the new discussion group that are added, deleted or changed by using the editing tool and sent by the client, and update the members and the subject of the new discussion group to the editing page of a local database in real time;

a confirmation unit, configured to generate, in response to a confirmation request sent by the client according to the editing page, a discussion page and an instant messaging link associated with each other, and send the instant messaging link to clients of all the members of the new discussion group; and an access request processing unit, configured to send the discussion page of the new discussion group to the client in response to an access request sent by the client according to the instant messaging link.

Preferably, the apparatus for creating a discussion group based on instant messaging further includes:

a marked content processing unit, configured to receive marked content sent by the client according to the discussion page of the discussion group, classify the marked content by time, type or subject, and save the marked content in the local database;

an email sharing request processing unit, configured to generate a sharing page according to the marked content in response to an email sharing request sent by the client according to the discussion page, and send the sharing page to the client; and take a discussion subject of the discussion group corresponding to the email sharing request as an email subject by default and take the members of the discussion group corresponding to the email sharing request as email recipients by default according to the email sharing request;

an email body generating unit, configured to receive shared content that is formed by one or more pieces of the marked content and sent by the client according to the sharing page, and generate an email body in a preset format according to the shared content by using a syntax tree;

an email page generating unit, configured to generate an email page according to the email body, the email subject and the email recipients, and send the email page to the client; and an email sharing unit, configured to package the email page into an email and send the email to email addresses corresponding to the email recipients in response to a sending request sent by the client according to the email page.

Embodiments of the present invention further provide an apparatus for creating a discussion group based on instant messaging, including a processor, a memory, and a computer program that is stored in the memory and configured to be executed by the processor, where when executing the computer program, the processor implements the above-mentioned method for creating a discussion group based on instant messaging.

Embodiments of the present invention further provide a system for creating a discussion group based on instant messaging, including a client and a server, where the client is configured to send a discussion group creating request to the server according to a page of an original discussion group;

the server is configured to create a new discussion group according to the discussion group creating request, take members of the original discussion group as members of the new discussion group by default, generate an editing page according to the new discussion group, and send the editing page to the client;

the client is further configured to send an editing request to the server according to the editing page;

the server is further configured to unlock an editing tool of the editing page according to the editing request;

the client is further configured to send, to the server, the members and a subject of the new discussion group that are added, deleted or changed by using the editing tool;

the server is further configured to update the members and the subject of the new discussion group to the editing page of a local database in real time;

the client is further configured to send a confirmation request to the server according to the editing page;

the server is further configured to generate, according to the confirmation request, a discussion page and an instant messaging link associated with each other, and send the instant messaging link to clients of all the members of the new discussion group;

the client is further configured to send an access request to the server according to the instant messaging link; and the server is further configured to send the discussion page of the new discussion group to the client according to the access request.

The embodiments of the present invention have the following beneficial effects:

The embodiments of the present invention provide a method, an apparatus and a system for creating a discussion group based on instant messaging. The method includes: creating a new discussion group in response to a discussion group creating request sent by a client according to a page of an original discussion group, and taking members of the original discussion group as members of the new discussion group by default; receiving the members and a subject of the new discussion group that are added, deleted or changed on an editing page and sent by the client, and updating the members and the subject of the new discussion group to the editing page of a local database in real time; generating, in response to a confirmation request sent by the client, a discussion page and an instant messaging link associated with each other, and sending the instant messaging link to clients of all the members of the new discussion group; and entering, by the client, the new discussion group through the link. In the present invention, a new discussion group can be created in an original discussion group, and the newly created discussion group is connected to an email system, thereby implementing automatic recognition and addition of members and subjects, which is fast and efficient and reduces the communication cost.

DESCRIPTION OF EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that the client in the embodiments of the present invention may be a mobile terminal or a non-mobile terminal. The non-mobile terminal includes a desktop computer. The mobile terminal includes mobile Internet devices capable of wireless communication, for example, a smart phone (such as an Android phone or an iOS phone), smart glasses, a smart watch, a smart band, a tablet computer, a notebook computer, and a personal digital assistant.

First Embodiment of the Present Invention

Figure 1:
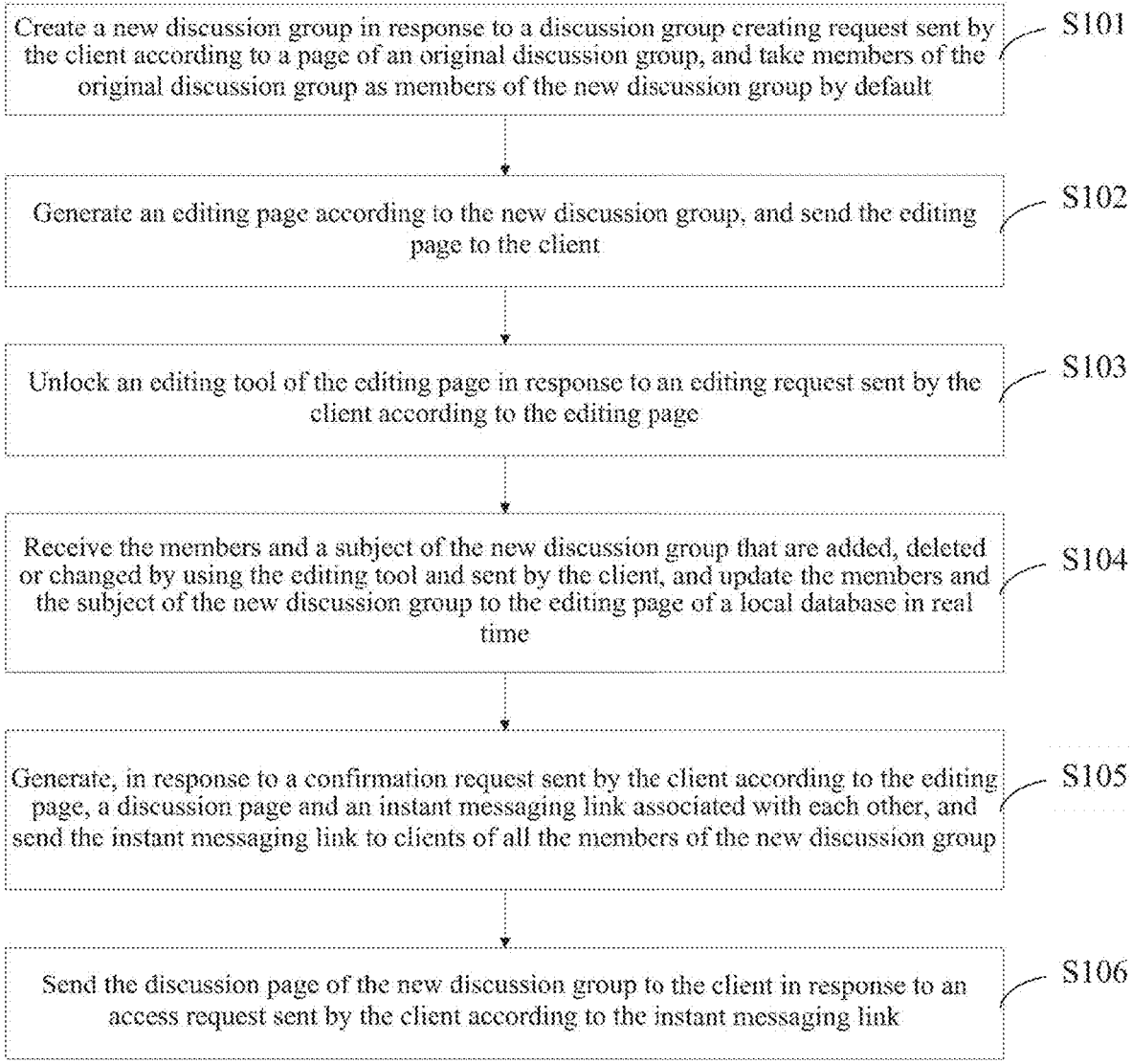
FIG. 1 is a schematic flowchart of a method for creating a discussion group based on instant messaging according to a first embodiment of the present invention.

Referring to FIG. 1. FIG. 1 is a schematic flowchart of a method for creating a discussion group based on instant messaging according to a first embodiment of the present invention.

The method for creating a discussion group based on instant messaging includes the following steps:

S101: create a new discussion group in response to a discussion group creating request sent by a client according to a page of an original discussion group, and take members of the original discussion group as members of the new discussion group by default.

In this embodiment, it may be appreciated that the page of the original discussion group, an editing page or a discussion page each includes one or a combination of more than one of a link, a text, a picture, or an attachment. The email contacts and the members are all related to an address book of the client. The address book includes names, email addresses, contact numbers, and departments and positions.

In this embodiment, by creating a new discussion in the original discussion group, members in the current discussion are dragged to the new discussion. In the new discussion, only contacts are the same as those of the original discussion, and all others need to be reset. Similar to the process of creating a new discussion, a new discussion subject, picture and the like need to be filled in. It may be appreciated that contacts are filled in before the new discussion begins. Because members not belonging to the original discussion may need to be added and some of the original members need to be deleted, the contacts may further be added, deleted or changed, instead of keeping the contacts of the original discussion unchanged. The purpose is to reduce user operations while ensuring function flexibility.

S102: generate an editing page according to the new discussion group, and send the editing page to the client.

S103: unlock an editing tool of the editing page in response to an editing request sent by the client according to the editing page.

S104: receive the members and a subject of the new discussion group that are added, deleted or changed by using the editing tool and sent by the client, and update the members and the subject of the new discussion group to the editing page of a local database in real time.

In this embodiment, a user may edit the editing page through the client. That is, after the editing tool of the editing page is unlocked according to the editing request sent by the editing page to a server, the user may add, delete or change the discussion subject, members, and discussion information flow of the editing page according to an actual situation. The server may update the subject, members, and discussion information flow of the new discussion group to the editing page of the local database in real time.

S105: generate, in response to a confirmation request sent by the client according to the editing page, a discussion page and an instant messaging link associated with each other, and send the instant messaging link to clients of all the members of the new discussion group.

S106: send the discussion page of the new discussion group to the client in response to an access request sent by the client according to the instant messaging link.

Figure 2:
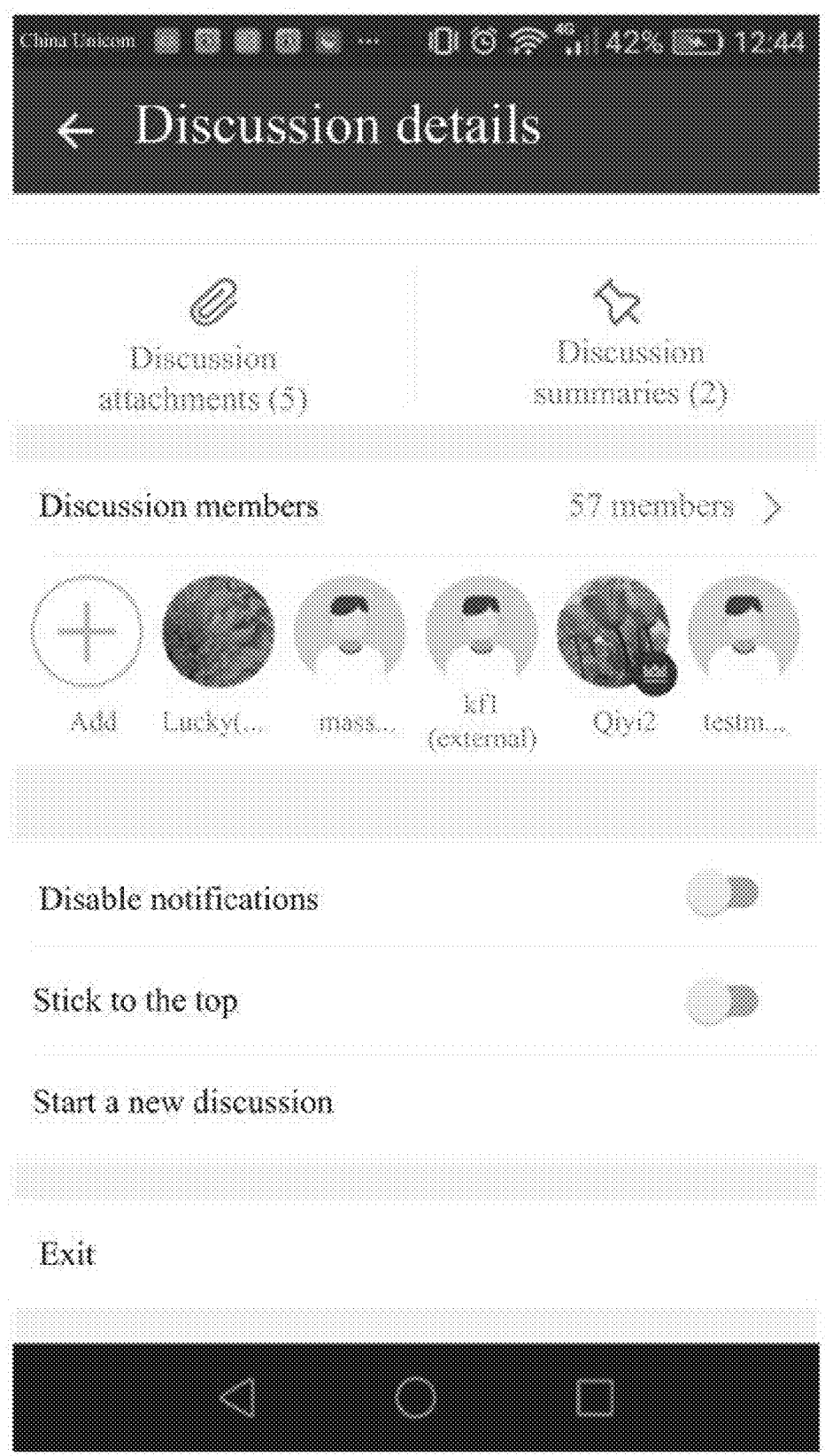
FIG. 2 is a schematic diagram of a page of an original discussion group in the first embodiment of the present invention.
Figure 3:
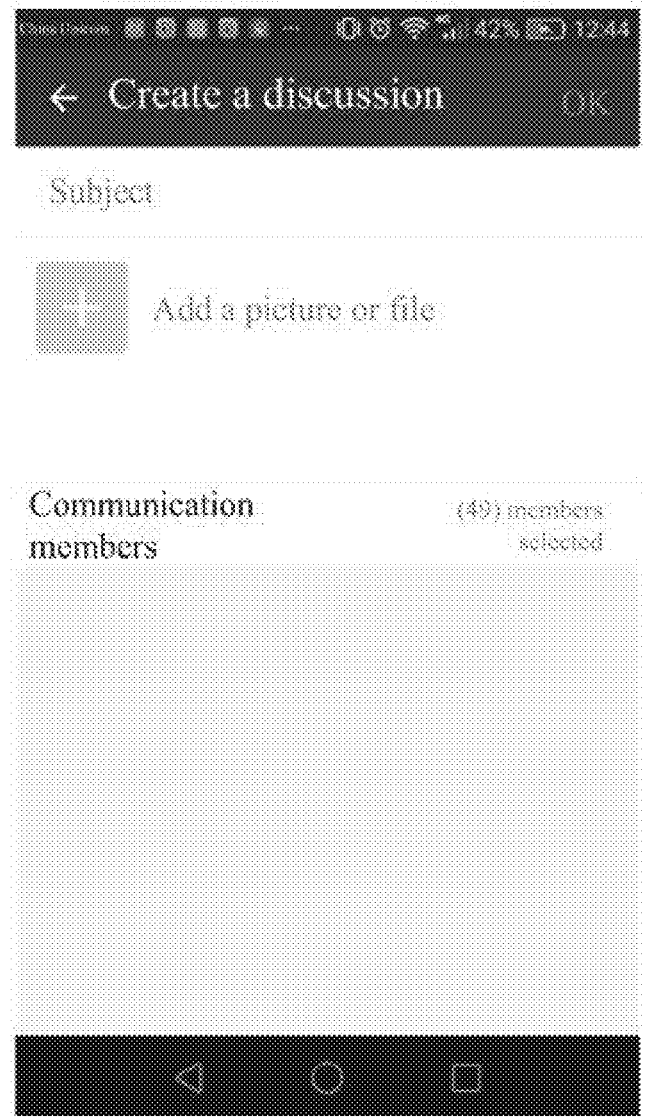
FIG. 3 is a schematic diagram of a discussion creating page in the first embodiment of the present invention.
Figure 4:
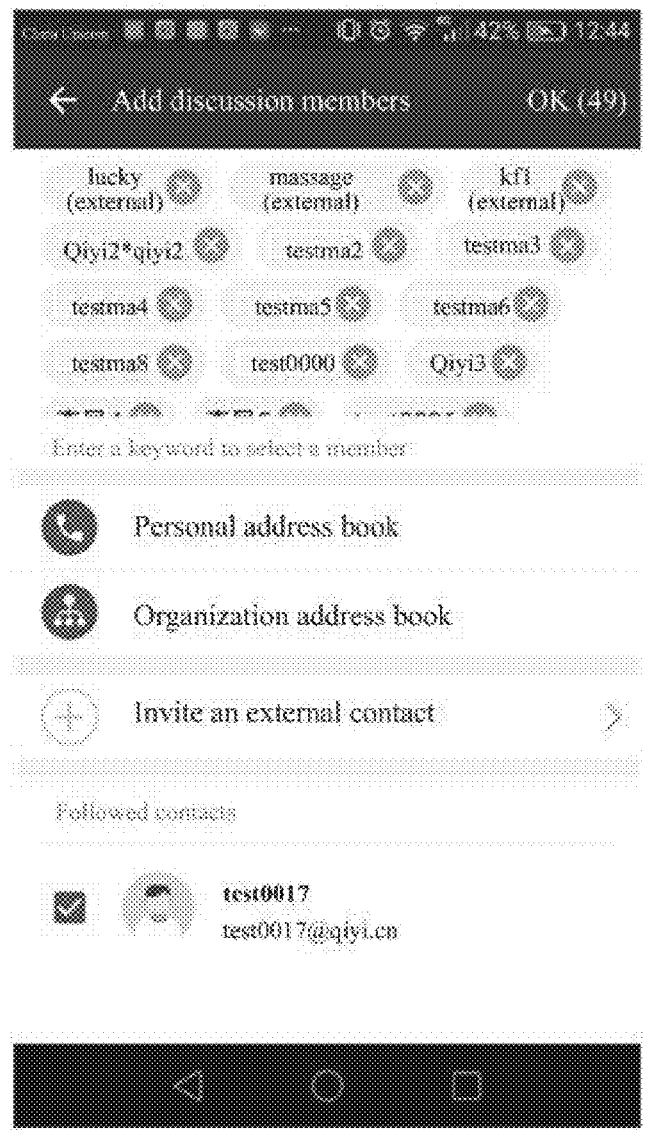
FIG. 4 is a schematic diagram of an editing page in the first embodiment of the present invention.
Figure 5:
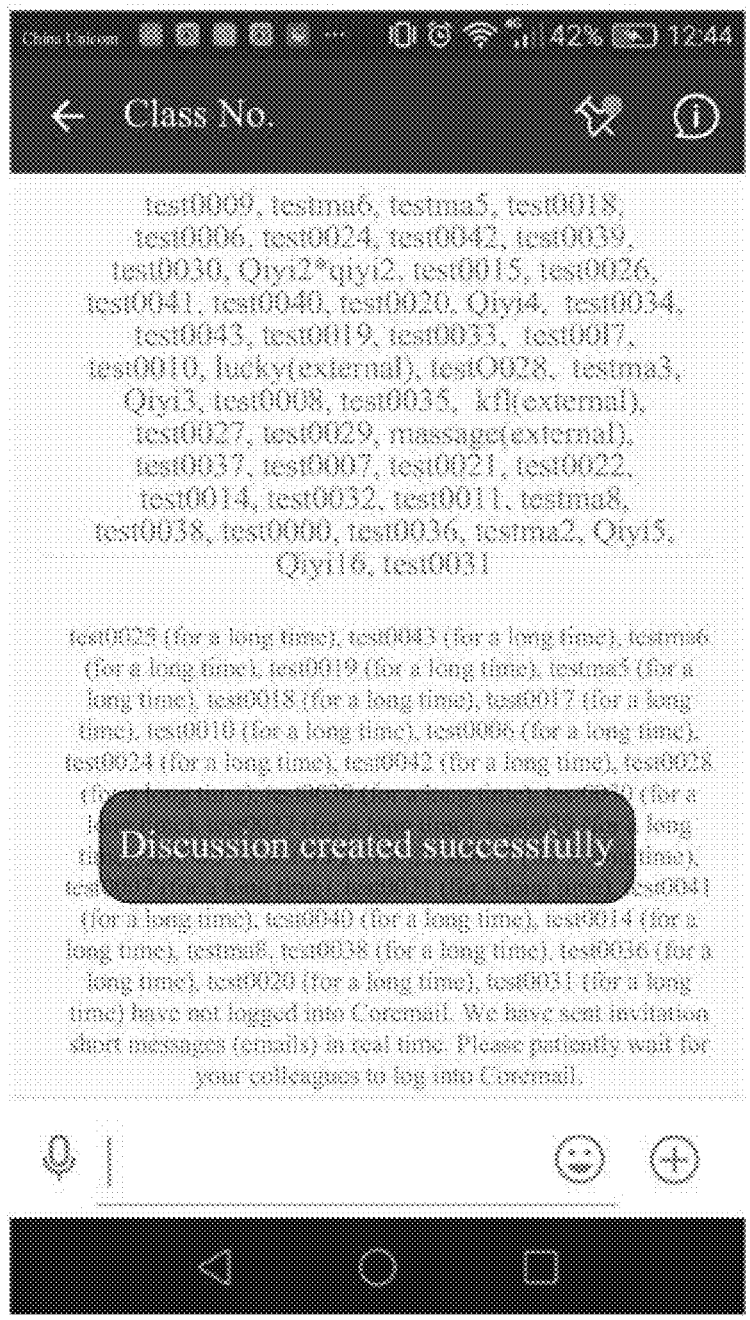
FIG. 5 is a schematic diagram of a creation success page in the first embodiment of the present invention.

Referring to FIG. 2, FIG. 3. FIG. 4 and FIG. 5. FIG. 2, FIG. 3. FIG. 4 and FIG. 5 are a schematic diagram of a page of an original discussion group, a schematic diagram of a discussion creating page, a schematic diagram of an editing page, and a schematic diagram of a creation success page in the first embodiment of the present invention respectively.

In this embodiment, in the process of creating a new discussion group, a new discussion subject is derived based on the original discussion. Therefore, an operation of initiating a new discussion is performed, and only the members of the original discussion are filled into the default discussion. It may be appreciated that the members of the original discussion are automatically filled as members of the new discussion. A list of original discussion members is pulled, the original discussion members, excluding the creator, are checked as new discussion members, and the discussion members may further be added, deleted or changed flexibly, to meet discussion creating data.

Based on the method for creating a discussion group based on instant messaging in the first embodiment of the present invention, this embodiment further provides a corresponding email sharing method.

Figure 6:
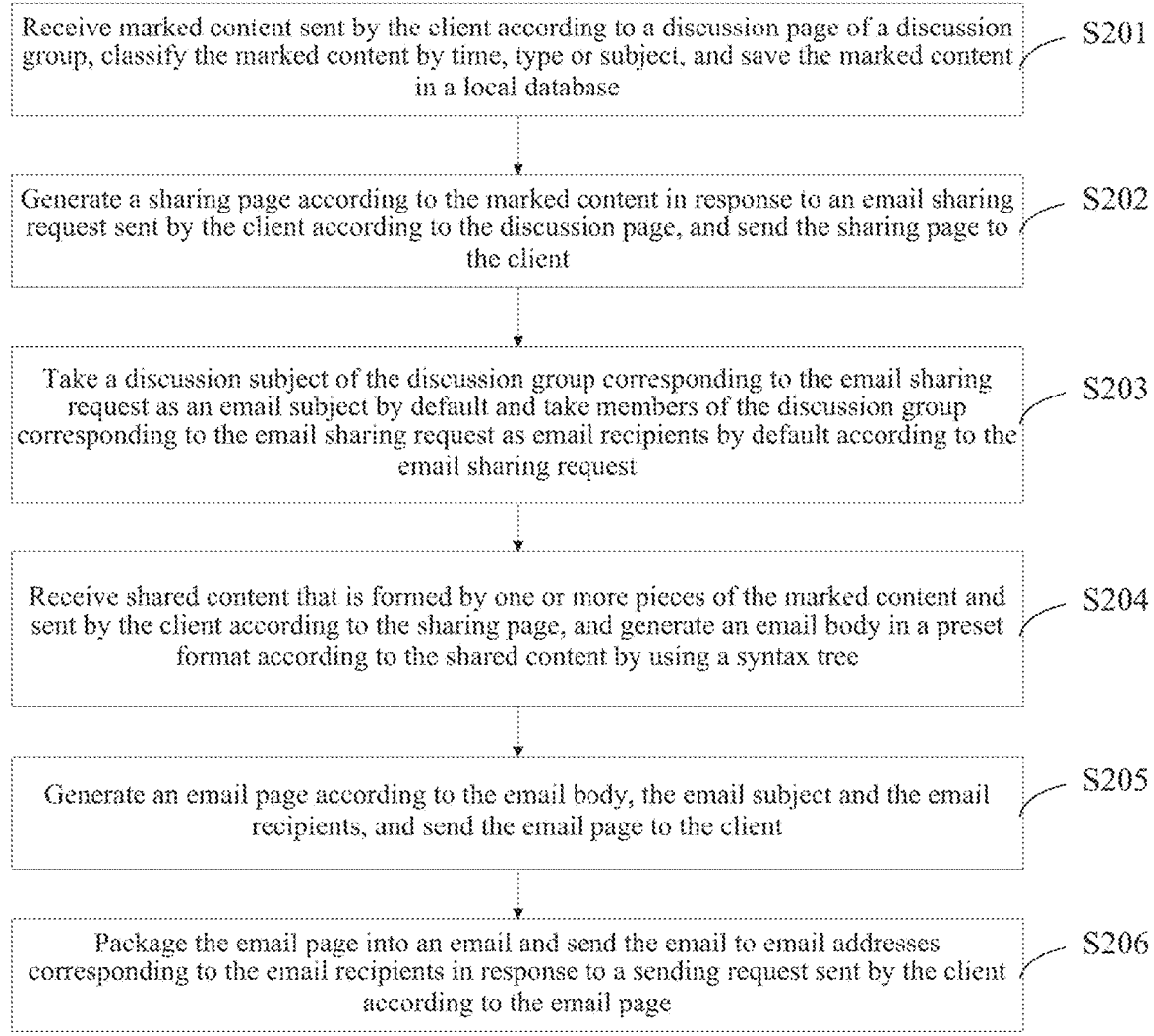
FIG. 6 is a schematic flowchart of an email sharing method in the first embodiment of the present invention.

Referring to FIG. 6. FIG. 6 is a schematic flowchart of an email sharing method in the first embodiment of the present invention.

The method for creating a discussion group based on instant messaging further includes the following steps:

S201: receive marked content sent by the client according to the discussion page of the discussion group, classify the marked content by time, type or subject, and save the marked content in the local database.

In this embodiment, the marked content is record content selected and marked by the client according to a discussion information flow of the discussion page. The record content is saved in the local database. The record content includes a link, a text, a picture, and an attachment. The discussion information flow and the marked content both include timestamps. It may be appreciated that, when multiple users discuss with each other by using clients, a discussion information flow is generated. For example, in a group chat process of the discussion group, the user may select content such as important information, solution, and work implementation in the discussion information flow as a summary and mark the content as marked content. The server sorts out and saves the marked content according to the timestamps, types, subjects or categories of the received marked content, to facilitate subsequent information sharing.

It should be noted that, in the process of selecting content such as important information, solution, and work implementation in the discussion information flow as a summary and marking the content as marked content, the user may perform editing operations such as adding, deletion, and change on the marked content according to an actual situation.

S202: generate a sharing page according to the marked content in response to an email sharing request sent by the client according to the discussion page, and send the sharing page to the client.

In this embodiment, the sharing page refers to a list page including the marked content that has been selected and marked by the user in the discussion information flow, and is used for allowing the user to select marked content to be shared. It may be appreciated that the server invokes an email interface to establish a connection to the discussion group of the client according to the email sharing request sent by the client.

S203: take a discussion subject of the discussion group corresponding to the email sharing request as an email subject by default and take the members of the discussion group corresponding to the email sharing request as email recipients by default according to the email sharing request.

In this embodiment, when the user sends the email sharing request through the client, the server searches for the discussion subject and members of the discussion group in response to the email sharing request, and automatically fills in the discussion subject and the members as the email subject and the email recipients.

S204: receive shared content that is formed by one or more pieces of the marked content and sent by the client according to the sharing page, and generate an email body in a preset format according to the shared content by using a syntax tree.

In this embodiment, after the user checks one or more pieces of the marked content on the sharing page through the client to form the shared content and sends the shared content to the server, the server extracts a message body from the shared content, recognizes a subject, a predicate and an object of the message body by using the syntax tree, and integrates the subject, the predicate, and the object into the email body according to the preset format.

S205: generate an email page according to the email body, the email subject and the email recipients, and send the email page to the client.

In this embodiment, the user may edit the email page through the client. That is, after an editing tool of the email page is unlocked according to an editing request sent by the email page to the server, the user may add, delete or change the email subject, the email recipients and the email body of the email page according to an actual situation. The server may update the email subject, the email recipients, and the email body to the email page of the local database in real time.

It should be noted that the discussion group members and the email recipients are all related to the address book of the client or related to an imported enterprise address book. The address book includes names, email addresses, contact numbers, and departments and positions.

S206: package the email page into an email and send the email to email addresses corresponding to the email recipients in response to a sending request sent by the client according to the email page.

It may be appreciated that the email recipients are automatically filled in according to the members of the discussion group, or may be added, deleted or changed by the user subsequently.

It should be noted that, before one-click email sharing of the marked content is implemented, the method should further include a process of establishing the discussion group, to implement instant messaging.

The method for creating a discussion group based on instant messaging provided by this embodiment of the present invention includes: creating a new discussion group in response to a discussion group creating request sent by a client according to a page of an original discussion group, and taking members of the original discussion group as members of the new discussion group by default; receiving the members and a subject of the new discussion group that are added, deleted or changed on an editing page and sent by the client, and updating the members and the subject of the new discussion group to the editing page of a local database in real time; generating, in response to a confirmation request sent by the client, a discussion page and an instant messaging link associated with each other, and sending the instant messaging link to clients of all the members of the new discussion group; and entering, by the client, the new discussion group through the link. In the present invention, a new discussion group can be created in an original discussion group, and the newly created discussion group is connected to an email system, thereby implementing automatic recognition and addition of members and subjects, which is fast and efficient and reduces the communication cost.

Second Embodiment of the Present Invention

Figure 7:
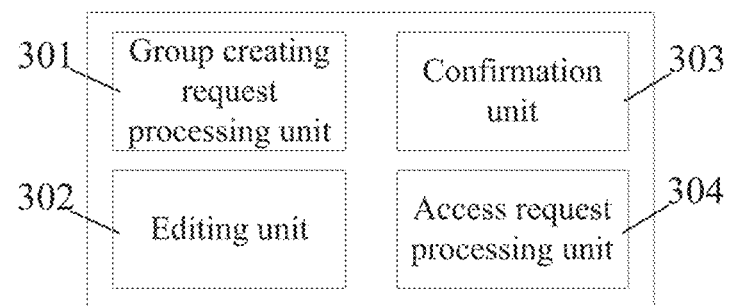
FIG. 7 is a schematic structural diagram of an apparatus for creating a discussion group based on instant messaging according to a second embodiment of the present invention.

Referring to FIG. 7. FIG. 7 is a schematic structural diagram of an apparatus for creating a discussion group based on instant messaging according to a second embodiment of the present invention.

The apparatus for creating a discussion group based on instant messaging includes a group creating request processing unit 301, an editing unit 302, a confirmation unit 303, and an access request processing unit 304.

The group creating request processing unit 301 is configured to create a new discussion group in response to a discussion group creating request sent by a client according to a page of an original discussion group, take members of the original discussion group as members of the new discussion group by default, generate an editing page according to the new discussion group, and send the editing page to the client.

In this embodiment, it may be appreciated that the page of the original discussion group, the editing page or a discussion page each includes one or a combination of more than one of a link, a text, a picture, or an attachment. The email contacts and the members are all related to an address book of the client. The address book includes names, email addresses, contact numbers, and departments and positions.

In this embodiment, by creating a new discussion in the original discussion group, members in the current discussion are dragged to the new discussion. In the new discussion, only contacts are the same as those of the original discussion, and all others need to be reset. Similar to the process of creating a new discussion, a new discussion subject, picture and the like need to be filled in. It may be appreciated that contacts are filled in before the new discussion begins. Because members not belonging to the original discussion may need to be added and some of the original members need to be deleted, the contacts may further be added, deleted or changed, instead of keeping the contacts of the original discussion unchanged The purpose is to reduce user operations while ensuring function flexibility.

The editing unit 302 is configured to unlock an editing tool of the editing page in response to an editing request sent by the client according to the editing page receive the members and a subject of the new discussion group that are added, deleted or changed by using the editing tool and sent by the client, and update the members and the subject of the new discussion group to the editing page of a local database in real time.

In this embodiment, a user may edit the editing page through the client. That is, after the editing tool of the editing page is unlocked according to the editing request sent by the editing page to a server, the user may add, delete or change the discussion subject, members, and discussion information flow of the editing page according to an actual situation. The server may update the subject, members, and discussion information flow of the new discussion group to the editing page of the local database in real time.

The confirmation unit 303 is configured to generate, in response to a confirmation request sent by the client according to the editing page, a discussion page and an instant messaging link associated with each other, and send the instant messaging link to clients of all the members of the new discussion group.

The access request processing unit 304 is configured to send the discussion page of the new discussion group to the client in response to an access request sent by the client according to the instant messaging link.

In this embodiment, in the process of creating a new discussion group, a new discussion subject is derived based on the original discussion. Therefore, an operation of initiating a new discussion is performed, and only the members of the original discussion are filled into the default discussion. It may be appreciated that the members of the original discussion are automatically filled as members of the new discussion. A list of original discussion members is pulled, the original discussion members, excluding the creator, are checked as new discussion members, and the discussion members may further be added, deleted or changed flexibly, to meet discussion creating data.

Figure 8:
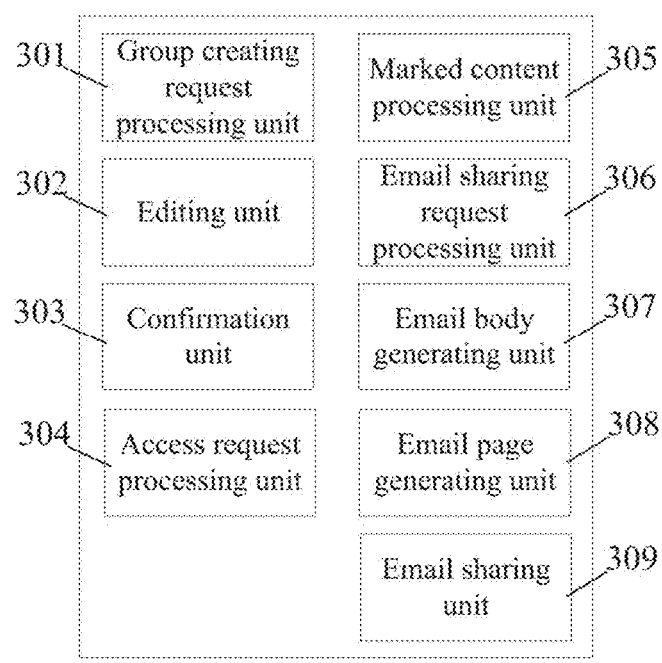
FIG. 8 is a schematic structural diagram of another apparatus for creating a discussion group based on instant messaging according to the second embodiment of the present invention.

Referring to FIG. 8. FIG. 8 is a schematic structural diagram of another apparatus for creating a discussion group based on instant messaging according to the second embodiment of the present invention.

The apparatus for creating a discussion group of based on instant messaging further includes a marked content processing unit 305, an email sharing request processing unit 306, an email body generating unit 307, an email page generating unit 308, and an email sharing unit 309.

The marked content processing unit 305 is configured to receive marked content sent by the client according to the discussion page of the discussion group, classify the marked content by time, type or subject, and save the marked content in the local database;

The email sharing request processing unit 306 is configured to generate a sharing page according to the marked content in response to an email sharing request sent by the client according to the discussion page, and send the sharing page to the client; and take a discussion subject of the discussion group corresponding to the email sharing request as an email subject by default and take the members of the discussion group corresponding to the email sharing request as email recipients by default according to the email sharing request;

The email body generating unit 307 is configured to receive shared content that is formed by one or more pieces of the marked content and sent by the client according to the sharing page, and generate an email body in a preset format according to the shared content by using a syntax tree;

The email page generating unit 308 is configured to generate an email page according to the email body, the email subject and the email recipients, and send the email page to the client; and The email sharing unit 309 is configured to package the email page into an email and send the email to email addresses corresponding to the email recipients in response to a sending request sent by the client according to the email page.

The apparatus for creating a discussion group based on instant messaging provided by this embodiment of the present invention creates a new discussion group in response to a discussion group creating request sent by a client according to a page of an original discussion group, and takes members of the original discussion group as members of the new discussion group by default; receives the members and a subject of the new discussion group that are added, deleted or changed on an editing page and sent by the client, and updates the members and the subject of the new discussion group to the editing page of a local database in real time and generates, in response to a confirmation request sent by the client, a discussion page and an instant messaging link associated with each other, and sends the instant messaging link to clients of all the members of the new discussion group. The client enters the new discussion group through the link. In the present invention, a new discussion group can be created in an original discussion group, and the newly created discussion group is connected to an email system, thereby implementing automatic recognition and addition of members and subjects, which is fast and efficient and reduces the communication cost.

This embodiment of the present invention further provides an apparatus for creating a discussion group based on instant messaging, including a processor, a memory, and a computer program that is stored in the memory and configured to be executed by the processor. When executing the computer program, the processor implements the foregoing method for creating a discussion group based on instant messaging.

Third Embodiment of the Present Invention

This embodiment of the present invention further provides a system for creating a discussion group based on instant messaging, including a client and a server.

The client is configured to send a discussion group creating request to the server according to a page of an original discussion group.

The server is configured to create a new discussion group according to the discussion group creating request, take members of the original discussion group as members of the new discussion group by default, generate an editing page according to the new discussion group, and send the editing page to the client.

The client is further configured to send an editing request to the server according to the editing page.

The server is further configured to unlock an editing tool of the editing page according to the editing request.

The client is further configured to send, to the server, the members and a subject of the new discussion group that are added, deleted or changed by using the editing tool.

The server is further configured to update the members and the subject of the new discussion group to the editing page of a local database in real time.

The client is further configured to send a confirmation request to the server according to the editing page.

The server is further configured to generate, according to the confirmation request, a discussion page and an instant messaging link associated with each other, and send the instant messaging link to clients of all the members of the new discussion group.

The client is further configured to send an access request to the server according to the instant messaging link.

The server is further configured to send the discussion page of the new discussion group to the client according to the access request.

The system for creating a discussion group based on instant messaging provided by this embodiment of the present invention creates a new discussion group in response to a discussion group creating request sent by a client according to a page of an original discussion group, and takes members of the original discussion group as members of the new discussion group by default; receives the members and a subject of the new discussion group that are added, deleted or changed on an editing page and sent by the client, and updates the members and the subject of the new discussion group to the editing page of a local database in real time; and generates, in response to a confirmation request sent by the client, a discussion page and an instant messaging link associated with each other, and sends the instant messaging link to clients of all the members of the new discussion group. The client enters the new discussion group through the link. In the present invention, a new discussion group can be created in an original discussion group, and the newly created discussion group is connected to an email system, thereby implementing automatic recognition and addition of members and subjects, which is fast and efficient and reduces the communication cost.

The descriptions above are preferred embodiments of the present invention, and it should be noted that for those of ordinary skill in the art, various improvements and modifications can be made without departing from the principles of the present invention. These improvements and modifications should also be regarded as falling into the protection scope of the present invention.

Those of ordinary skill in the art can understand that all or some of processes for implementing the methods of the foregoing embodiments can be completed by instructing relevant hardware through a computer program. The program may be stored in a computer readable storage medium. When the program is executed, processes of the embodiments of the foregoing methods may be included. The storage medium may be a magnetic disk, an optical disc, a read-only memory (ROM), a random access memory (RAM), or the like.

The invention claimed is:

1. A method for creating a discussion group based on instant messaging, comprising following steps:
   creating a new discussion group in response to a discussion group creating request sent by a client according to a page of an original discussion group, wherein members of the original discussion group are respectively used as members of the new discussion group by default;
   generating an editing page according to the new discussion group, and sending the editing page to the client;
   unlocking an editing tool of the editing page in response to an editing request sent by the client according to the editing page;
   receiving the members and a subject of the new discussion group that are added, deleted or changed by using the editing tool and sent by the client, and updating the members and the subject of the new discussion group to the editing page of a local database in real time;
   generating, in response to a confirmation request sent by the client according to the editing page, a discussion page and an instant messaging link associated with each other, and sending the instant messaging link to clients of all the members of the new discussion group;
   sending the discussion page of the new discussion group to the client in response to an access request sent by the client according to the instant messaging link;
   receiving marked content sent by the client according to the discussion page of the discussion group, classifying the marked content by time, type or subject, and saving the marked content in the local database;
   generating a sharing page according to the marked content in response to an email sharing request sent by the client according to the discussion page, and sending the sharing page to the client;
   taking a discussion subject of the discussion group corresponding to the email sharing request as a subject of an email by default and taking the members of the discussion group corresponding to the email sharing request as recipients of the email by default according to the email sharing request;
   receiving shared content that is formed by one or more pieces of the marked content and sent by the client according to the sharing page, and generating a body of the email in a preset format according to the shared content by using a syntax tree;
   generating a page of the email according to the body of the email, the subject of the email and the recipients of the email, and sending the page of the email to the client; and
   packaging the page of the email to form the email and sending the email to email addresses corresponding to the recipients of the email in response to a sending request sent by the client according to the page of the email.

2. The method for creating a discussion group based on instant messaging according to claim 1, wherein the page of the original discussion group, the editing page and the discussion page each comprise one or a combination of more than one of a link, a text, a picture, or an attachment.

3. An apparatus for creating a discussion group based on instant messaging, comprising a processor, a memory, and a computer program that is stored in the memory and configured to be executed by the processor, wherein when executing the computer program, the processor implements the method for creating a discussion group based on instant messaging according to claim 2.

4. The method for creating a discussion group based on instant messaging according to claim 1, wherein the members of the original discussion group and the members of the new discussion group are all associated with an address book of the client; and the address book comprises names, email addresses, contact numbers, and departments and positions.

5. An apparatus for creating a discussion group based on instant messaging, comprising a processor, a memory, and a computer program that is stored in the memory and configured to be executed by the processor, wherein when executing the computer program, the processor implements the method for creating a discussion group based on instant messaging according to claim 4.

6. The method for creating a discussion group based on instant messaging according to claim 1, further comprising:
  synchronously updating marked content in the local database in real time in response to an operation instruction edited by the client according to the marked content, wherein the marked content is record content selected and marked by the client according to a discussion information flow of the discussion page; the record content is saved in the local database; the record content comprises a link, a text, a picture, and an attachment; and the discussion information flow and the marked content both comprise timestamps.

7. An apparatus for creating a discussion group based on instant messaging, comprising a processor, a memory, and a computer program that is stored in the memory and configured to be executed by the processor, wherein when executing the computer program, the processor implements the method for creating a discussion group based on instant messaging according to claim 6.

8. The method for creating a discussion group based on instant messaging according to claim 1, wherein the generating a body of the email in a preset format according to the shared content by using a syntax tree specifically comprises:
  extracting a message body from the shared content; and recognizing a subject, a predicate, and an object of the message body by using the syntax tree, and integrating the subject, the predicate and the object into the body of the email according to the preset format.

9. An apparatus for creating a discussion group based on instant messaging, comprising a processor, a memory, and a computer program that is stored in the memory and configured to be executed by the processor, wherein when executing the computer program, the processor implements the method for creating a discussion group based on instant messaging according to claim 8.

10. An apparatus for creating a discussion group based on instant messaging, comprising a processor, a memory, and a computer program that is stored in the memory and configured to be executed by the processor, wherein when executing the computer program, the processor implements the method for creating a discussion group based on instant messaging according to claim 1.

11. An apparatus for creating a discussion group based on instant messaging, comprising:

a group creating request processing unit, configured to create a new discussion group in response to a discussion group creating request sent by a client according to a page of an original discussion group, take members of the original discussion group as members of the new discussion group by default, generate an editing page according to the new discussion group, and send the editing page to the client;

an editing unit, configured to unlock an editing tool of the editing page in response to an editing request sent by the client according to the editing page; receive the members and a subject of the new discussion group that are added, deleted or changed by using the editing tool and sent by the client, and update the members and the subject of the new discussion group to the editing page of a local database in real time;

a confirmation unit, configured to generate, in response to a confirmation request sent by the client according to the editing page, a discussion page and an instant messaging link associated with each other, and send the instant messaging link to clients of all the members of the new discussion group;

an access request processing unit, configured to send the discussion page of the new discussion group to the client in response to an access request sent by the client according to the instant messaging link;

a marked content processing unit, configured to receive marked content sent by the client according to the discussion page of the discussion group, classify the marked content by time, type or subject, and save the marked content in the local database;

an email sharing request processing unit, configured to generate a sharing page according to the marked content in response to an email sharing request sent by the client according to the discussion page, and send the sharing page to the client; and take a discussion subject of the discussion group corresponding to the email sharing request as a subject of an email by default and take the members of the discussion group corresponding to the email sharing request as recipients of the email by default according to the email sharing request;

an email body generating unit, configured to receive shared content that is formed by one or more pieces of the marked content and sent by the client according to the sharing page, and generate a body of the email in a preset format according to the shared content by using a syntax tree;

an email page generating unit, configured to generate a page of the email according to the body of the email, the subject of the email and the recipients of the email, and send the page of the email to the client; and an email sharing unit, configured to package the page of the email to form the email and send the email to email addresses corresponding to the recipients of the email in response to a sending request sent by the client according to the page of the email.

\* \* \* \* \*